Oct. 12, 1954
J. W. BOWDEN
2,691,352
DRY GLAZING
Filed May 17, 1952
2 Sheets-Sheet 1
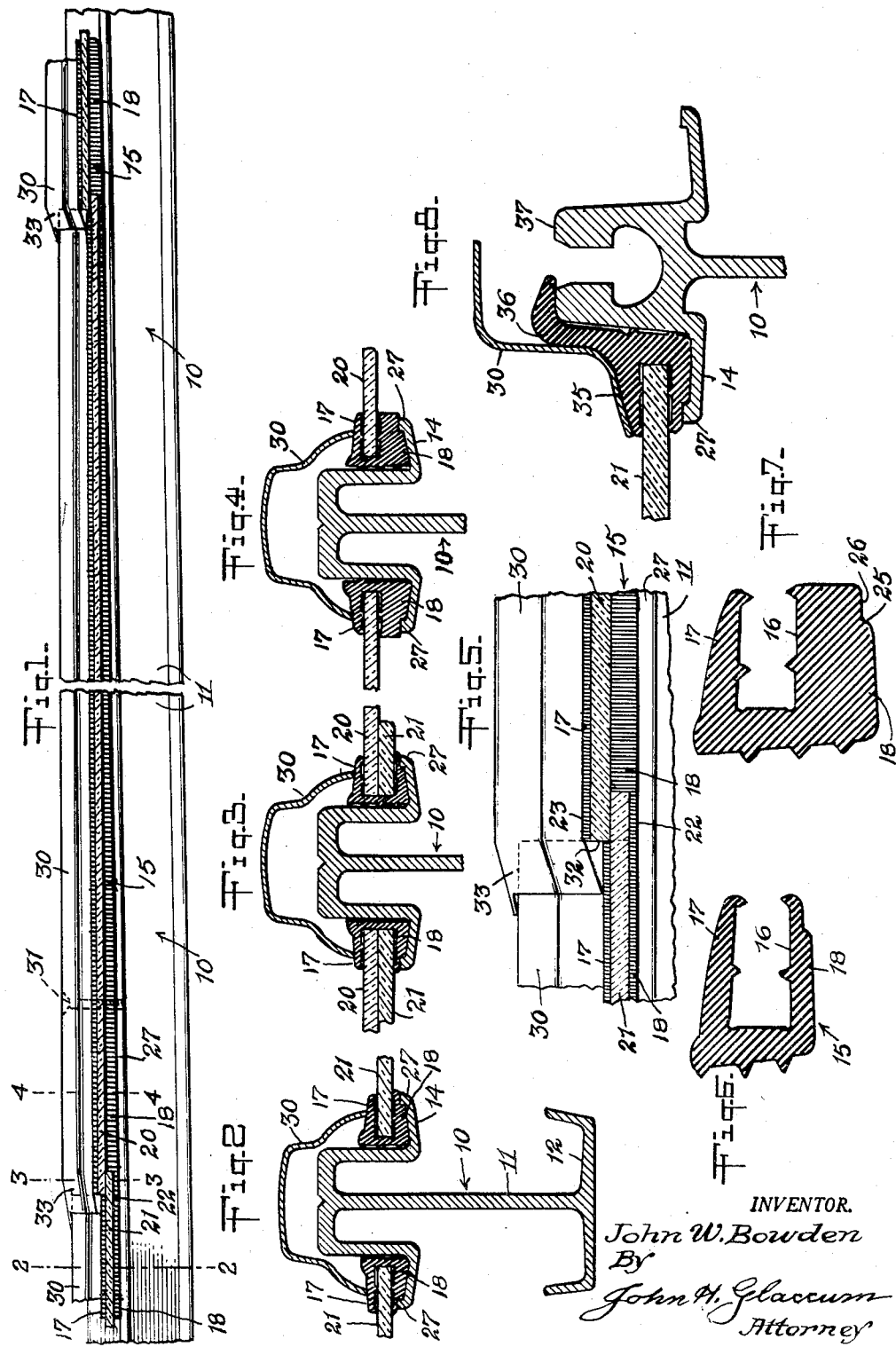
INVENTOR.
John W. Bowden
By
John H. Glaccum
Attorney

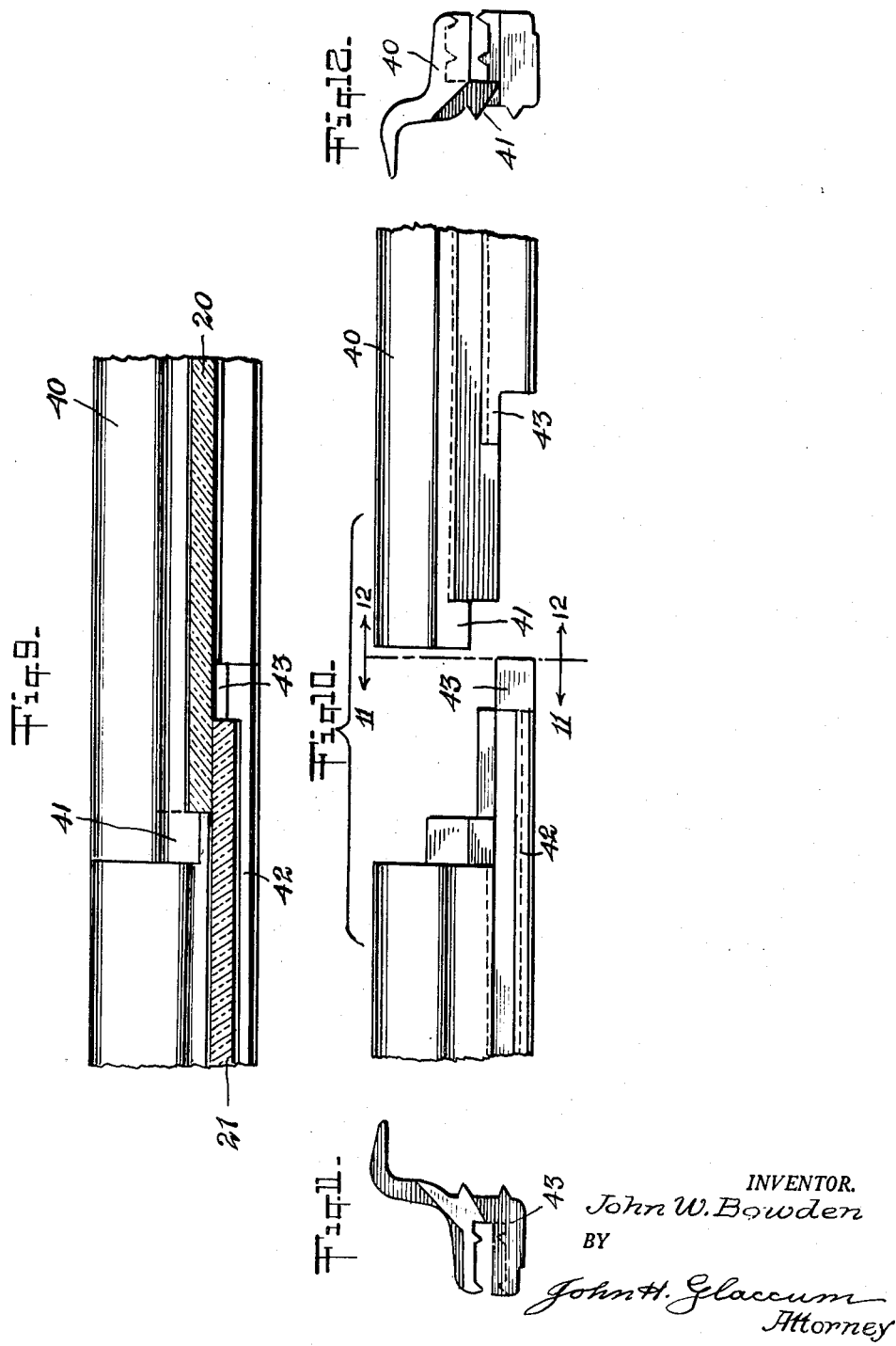

Patented Oct. 12, 1954

2,691,352

UNITED STATES PATENT OFFICE 2,691,352

DRY GLAZING

John W. Bowden, Irvington, N. Y., assignor to Lord & Burnham, Division of Burnham Corporation, Irvington-on-Hudson, N. Y., a corporation of New York Application May 17, 1952, Serial No. 288,570

6 Claims. (Cl. 108—16)

This invention relates to a roof construction particularly for greenhouses and also for any other structure where glass is used in overlap relation. One of the objects of the invention is to provide a greenhouse roof of longer life with a minimum of maintenance. The present practice is to mount the glass in a glazing compound which has a relatively short life and which must be constantly repaired and painted.

A further object of the invention is to provide a dry glazing structure forming a water-tight seal from the outside to the inside of the greenhouse or glass enclosure.

A still further object is to provide a tapered molding which may be installed on the light of glass prior to final placement in the structure thereby providing a more rapid installation and the application of the molding at a convenient and safe location. This provides greater safety to the workmen installing the glass as there is less danger of them cutting themselves. Accordingly, the skill of the workmen may be less than that required in conventional installations.

An advantage of this invention is that it provides for the stiffening, in the plane of the glass, of the structure of the greenhouse or glass enclosure in order to take care of static or dynamic stresses developing in and applied to the structure through the joints between the cover cap, molding, glass and the roof bar.

It is most important in structures of glass which overlap that the surfaces of the overlapping glass contact each other squarely. Unless the surfaces of the glass are flush there is only contact at one point, and there is danger of rain being blown between the lights. One of the advantages of this invention is that the molding is so constructed as to insure complete contact between the surfaces of the glass.

In addition to the foregoing, this improvement would give even support to the glass and a uniform distribution of load to the ledge on the roof bar which will result in reduced breakage of glass due to differential rates of expansion and contraction of the greenhouse structure or any part thereof.

Further objects and advantages will appear from the accompanying drawings and the following description.

In the drawings—

Fig. 1 is a side elevation of a structure embodying my invention.

Fig. 2 is a cross-sectional view taken on the line 2—2 of Fig. 1.

Figs. 3 and 4 are similar views taken on the lines 3—3 and 4—4 of Fig. 1.

Fig. 5 is an enlarged detailed view of the area between 2 and 4 of Fig. 1.

Fig. 6 is a cross-sectional view of the molding toward the upper end thereof.

Fig. 7 is a similar view of the molding toward the lower end thereof.

Fig. 8 is a cross-sectional view showing a modification.

Fig. 9 is an enlarged view of an improved type of molding showing the abutting sections thereof.

Fig. 10 is a similar view but showing the sections separated.

Fig. 11 is a cross-sectional view taken on the line 11—11 of Fig. 10.

Fig. 12 is an end view taken on the line 12—12 of Fig. 10.

Referring more particularly to the drawings, I provide a roof bar 10 having a web 11 and a drain gutter 12 and a ledge 14 to receive and support glass. In the conventional structure glass is supported by a similar ledge and a roof bar and is positioned thereon with putty or other glazing compound which normally is subject to the weather.

I provide a strip in the form of a molding. This strip 15 has a U-shaped cavity 16 adapted to receive a pane of glass and the strips 17 and 18 defining the cavity. The top strip 17 is approximately the same thickness from end to end. The bottom strip 18 varies from a thickness about equal to the top strip at one end to a thickness equal to its original thickness plus the thickness of the glass to be accommodated at the other end.

Referring particularly to Fig. 5 I show two panes of glass 20 and 21, pane 20 being nearer the top of the roof than the pane 21 and the pane 20 overlapping the pane 21. It will be noticed that the lower end portion of the molding 15 abuts the upper end of the glass 21 and is of a height equal to the glass and the overlap extension 22 of the molding under the glass 21. It will be noted that the upper section 17 of the molding 15 is of more or less uniform thickness. The lower section 18 of the strip 15 which carries the glass 21 is of the same thickness at this point as the upper section 17. The lower section 18 is provided with an overlapping extension 22 corresponding to a similar overlap extension 23 on the lower end of the upper section 17, so that the glass is completely covered and protected. Each of the molding sections is identical and interchangeable and each of the lower sections 18 of the molding sections tapers from the portion which abuts the lower pane to that which contacts the upper pane. The lower section 18 of the molding may be formed with a shoulder 25 defining a recessed portion 26 which is adapted to snugly fit the outer edge 27 of the ledge 14.

In constructing the greenhouse the molding strips 15 may be placed on the glass lights as heretofore described and the lights placed directly onto the roof bars. Since the extensions on either end of the moldings define the proper overlap, it is a simple matter to place them in the proper place. Barcaps may be used to seal the structure in place.

The barcap 30, which is of the same length as the glass, is fastened to the roof bar by means of screws, as indicated at 31. This holds the barcap firmly in position with one edge 32 abutting the upper pane to prevent it from sliding. The other edge of the barcap 33 overlaps the adjoining cap, thus holding it in place.

It will be seen that I have provided a dry glazing structure which requires no glazing nails or other items subject to failure to hold the glass firmly in place and to prevent any moisture from getting through due to the pressure of the barcap on the molding. My molding may be of any plastic rubbery material or of rubber. Since it is not subjected to friction or undue stresses, it may be made of inexpensive grade.

In the modification shown in Fig. 8, the molding 35 is provided with a neck 36 adapted to come up and over the top 37 of the roof bar so that it is in contact with the barcap not only where the molding supports the glass but, also, the side of the roof bar.

In the modification shown in Figs. 9 to 12, inclusive, the more secure and somewhat more refined type of molding is shown. In that structure the same principle is involved. However, the upper strip 40 is provided at its end with a position bump or locking projection 31 while the lower strip 42 is provided with a similar projection 43, so that each strip of molding extends over the edge of the glass it supports. In this way the edges of the glass are completely sealed and protected against the weather and the molding may only be applied to the glass in the correct position.

I claim:

1. In a greenhouse construction wherein glass is overlapped, dry glazing therefor comprising a pre-formed glazing molding of flexible resilient material of a length approximating the length of the light of glass and having a pair of strips defining a U-shaped cavity, the top strip being of a uniform thickness and the bottom strip being tapered from a thickness equal to that of the top strip at one end to a thickness equal to the top strip plus the thickness of the glass in the other end.

2. In a greenhouse construction wherein glass is overlapped, dry glazing therefor comprising a glazing molding of flexible resilient material having a pair of strips defining a U-shaped cavity, the top strip being of a uniform thickness and the bottom strip being tapered from a thickness equal to that of the top strip at one end to a thickness equal to the top strip plus the thickness of the glass in the other end, the top strip extending beyond the bottom strip at the thick end a distance equal to the overlap of the glass and the bottom strip extending at its thin end an equal distance.

3. In a greenhouse construction wherein glass is overlapped, dry glazing therefor comprising a glazing molding of flexible resilient material having a pair of strips defining a U-shaped cavity, the top strip being of a uniform thickness and the bottom strip being tapered from a thickness equal to that of the top strip at one end to a thickness equal to the top strip plus the thickness of the glass in the other end, and a bar-cap covering said molding and pressing it against the glass.

4. In a greenhouse construction wherein glass is overlapped, dry glazing therefor comprising a glazing molding of flexible resilient material having a pair of strips defining a U-shaped cavity, the top strip being of a uniform thickness and the bottom strip being tapered from a thickness equal to that of the top strip at one end to a thickness equal to the top strip plus the thickness of the glass in the other end, the top strip extending beyond the bottom strip at the thick end a distance equal to the overlap of the glass and the bottom strip extending at its thin end an equal distance, and a bar-cap covering said molding and pressing it against the glass.

5. In a greenhouse construction wherein a roof-bar supports glass in overlapping relationship, a pre-formed glazing molding of flexible resilient material positioned between said glass and said roof-bar and means for compensating for the overlap of said glass, said means maintaining said glass in the overlapped section in parallel relationship, and said means comprising a taper in the lower portion of said molding to a point where it abuts the lower glass to a point where it supports the next upper glass.

6. In a greenhouse construction where glass is overlapped, dry glazing therefor comprising a glazing molding of flexible resilient material having a pair of strips defining a U-shaped cavity, the top strip being of a uniform thickness and the bottom strip being tapered to a thickness equal to the top strip at one end to a thickness equal to the top strip plus the thickness of the glass at the other end, each strip having at its lower end a projection extending over the edge of the overlapping glass and at its other end a projection extending over the edge of the lower piece of glass.

References Cited in the file of this patent

FOREIGN PATENTS

| Number | Country | Date |
|--------|---------|------|
| 367,538 | Great Britain | of 1932 |